June 19, 1962 P. H. SHERRON 3,039,568

ROOF CAP FOR MULTIPLE TELEPHONE BOOTH ASSEMBLIES

Filed June 22, 1959 2 Sheets-Sheet 1

INVENTOR.

PERCIVAL H. SHERRON

BY Busser Smith & Harding

ATTORNEYS

June 19, 1962 P. H. SHERRON 3,039,568

ROOF CAP FOR MULTIPLE TELEPHONE BOOTH ASSEMBLIES

Filed June 22, 1959 2 Sheets-Sheet 2

INVENTOR.
PERCIVAL H. SHERRON
BY Busser Smith & Harding

ATTORNEYS

United States Patent Office
3,039,568
Patented June 19, 1962

3,039,568

ROOF CAP FOR MULTIPLE TELEPHONE BOOTH ASSEMBLIES

Percival H. Sherron, Jamaica, N.Y. (% Sherron Metallic Corp., 1201 Flushing Ave., Brooklyn 37, N.Y.)
Filed June 22, 1959, Ser. No. 822,108
1 Claim. (Cl. 189—2)

This invention relates generally to telephone booth constructions, and is particularly concerned with improved means for closing off the space btween telephone booths positioned in side-by-side relation, thereby to improve the appearance of the assembled booths and to eliminate spaces between the booths wherein refuse might accumulate.

In multiple telephone booth assemblies there is usually a space between each pair of successive telephone booths wherein dirt, cigarette butts and other refuse might accumulate, in consequence of which it is necessary, for the sake of cleanliness and neatness in appearance, to close off the space between the telephone booths in the front thereof, and, for the sake of cleanliness, to close off the space between the telephone booths along the tops thereof. An important object of the present invention is to provide improved means for closing off the spaces between adjacent telephone booths in order to assure an attractive appearance of the telephone booth assembly, and in order to prevent unsightly accumulation of refuse between the telephone booths.

Other objects of the present invention will become apparent from the following description when read in conjunction with the accompanying drawings, in which.

Figure 3:
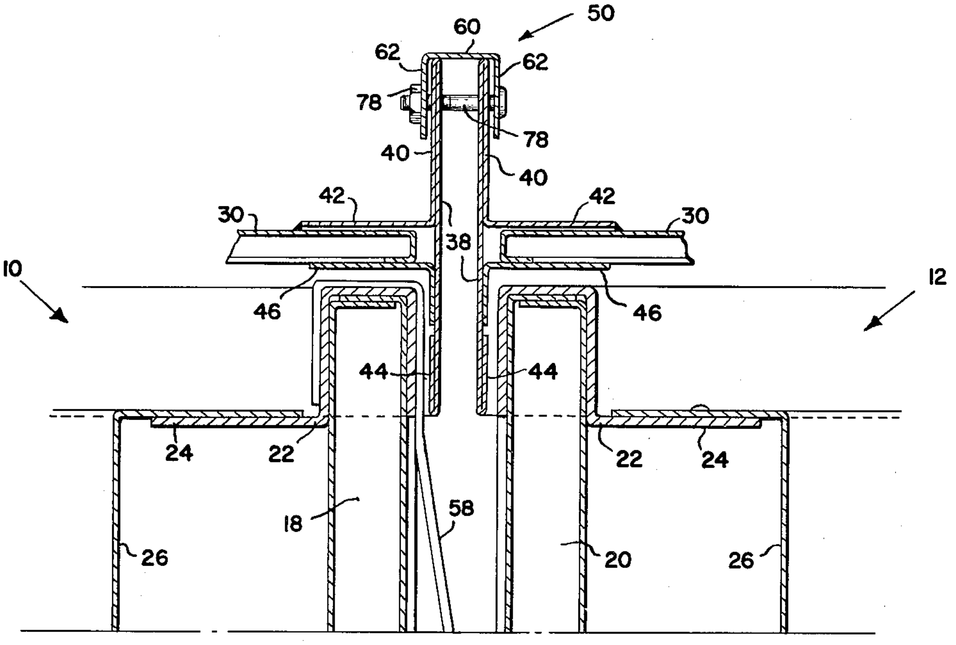
FIGURE 3 is a vertical section through the upper portion of the booths of the assembly shown in FIGURE 1, looking toward the rear of the booths.

Referring to the drawing, the exemplary multiple telephone booth structure constructed in accordance with and embodying the principles of the present invention comprises a pair of telephone booths respectively designated 10 and 12. Each of these telephone booths is provided with four suitable corner posts supporting lintel panels extending about the top of the telephone booth, the lintels extending across the front and the rear of the telephone booth being respectively designated 14 and 16 and the lintels extending along the sides of the booth being respectively designated 18 and 20. Fitted over the tops of the several lintels are brackets 22 having flanges 24 extending horizontally inwardly from the lintels thereby to furnish means for supporting a ceiling structure 26.

Mounted upon the top of the booth is a roof frame, generally designated 28, which carries a roof pan 30. Extending across the front of the booth is a section of the roof frame, designated 32, and extending rearwardly from the section 32 respectively along opposite sides of the booth are roof frame sections respectively designated 34 and 36.

The roof frame is preferably made of sheet metal suitably worked to provide a horizontally extending face 38 disposed in a vertical plane, an area being turned downwardly and inwardly from the face 38 and then horizontally inwardly from the face 38 to provide longitudinally extending main and auxiliary flanges, respectively designated 40 and 42, and another area being turned upwardly and inwardly from the face 38, as at 44.

Disposed in underlying spaced relation to the flange 42 is the horizontally extending leg of a bracket 46 secured to the inner side of the face 38. The marginal areas of the roof pan 30 are received between the flange 42 and the bracket 46.

Figure 1:
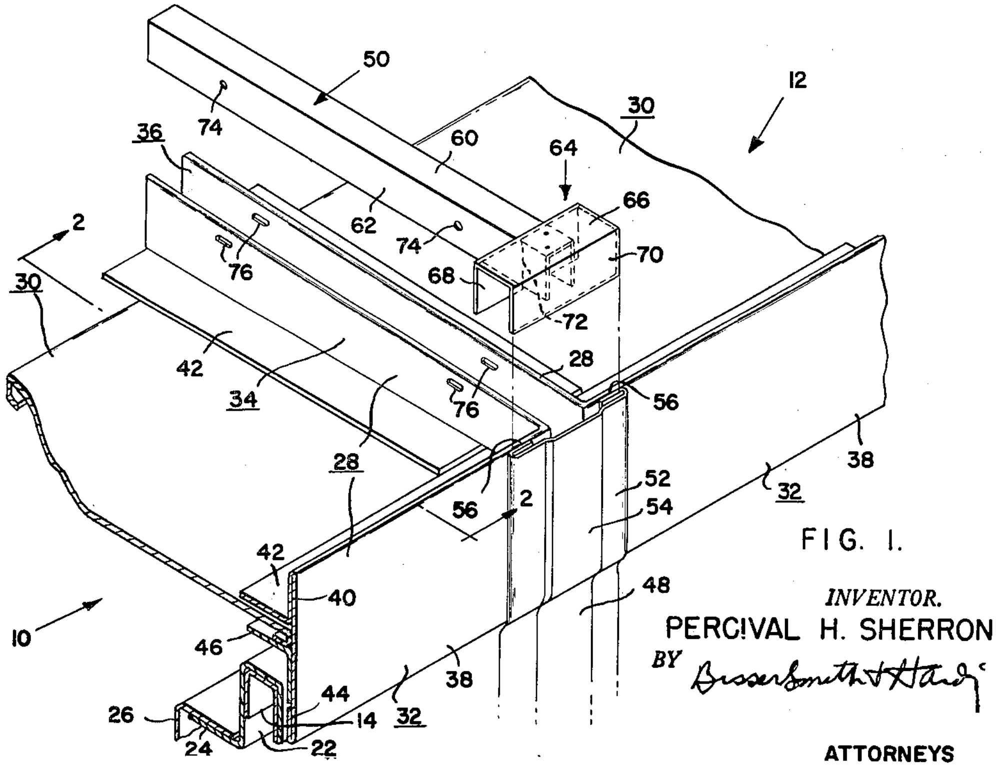
FIGURE 1 is an exploded perspective view of a multiple telephone booth assembly constructed in accordance with and embodying the principles of the present invention.

Referring particularly to FIGURES 1 and 3, it may be noted that the booths 10 and 12 are separated by a substantial space which should be closed off to prevent the accumulation of dirt, cigarette butts and other refuse therein, and to give the multiple booth structure a more attractive appearance. Accordingly, the front of the booth is fitted with a vertically extending moulding member 48 preferably made of sheet metal, and the top of the booth is provided with a roof cap member 50 preferably made of sheet metal. The moulding member 48 is of channel shape in transverse section being provided with longitudinally extending main body part 52 having a raised area 54 and being provided with longitudinally extending opposite side areas turned back upon the main body part 52 and respectively forming flanges 56. Disposed between the booths is an articulated frame employed for aligning the front surfaces of the booths and securing the channeled moulding member 48 in place. Only the straps 58 of this articulated frame are shown. Reference may be had to applicant's copending application, Serial No. 775,931 filed November 24, 1958, now Patent No. 2,995,221, for the details of this articulated frame structure, and for the manner in which it operates to tie in the channeled moulding member 48, and to align the booths. It should be noted, however, that the upper end of the channeled moulding member 48 is open and that the flanges 56 respectively abut the surfaces of the booths 10 and 12.

The roof cap member 50 is an elongated member of inverted U-shape in transverse section, being provided with a top wall 60 and opposite side walls 62. The fore end of the member 50 is fitted with a crosspiece 64 also of inverted U-shape, being provided with a top wall 66 and opposite side walls respectively designated 68 and 70. The side wall 68 of the crosspiece is provided with a cutout 72 through which the fore end of the member 50 extends to a point set back from the side wall 70 of the crosspiece. The crosspiece 64 is rigidly secured to the member 50 as by welding. The opposite side walls of the member 50 are each provided with a pair of apertures 74, and the opposed flanges 34 and 36 respectively of the roof frames 28 are each provided with a pair of elongated apertures 76, all of which are suitably aligned for receiving a pair of bolts 78.

It may be observed that when the roof cap 50 is in place, the oppositely facing flanges 40 respectively of the opposed roof frame sections 34 and 36 are embraced thereby, the gap therebetween being bridged by the wall 60 of the member 50. In addition, the wall 66 of the crosspiece 64 extends over the oppositely facing flanges 40 respectively of the opposed roof frame sections 34 and 36, and the side wall 70 of the crosspiece 64 overhangs the sections 32 of the roof frames and projects downwardly into the open end of the channeled moulding member 48.

Figure 2:
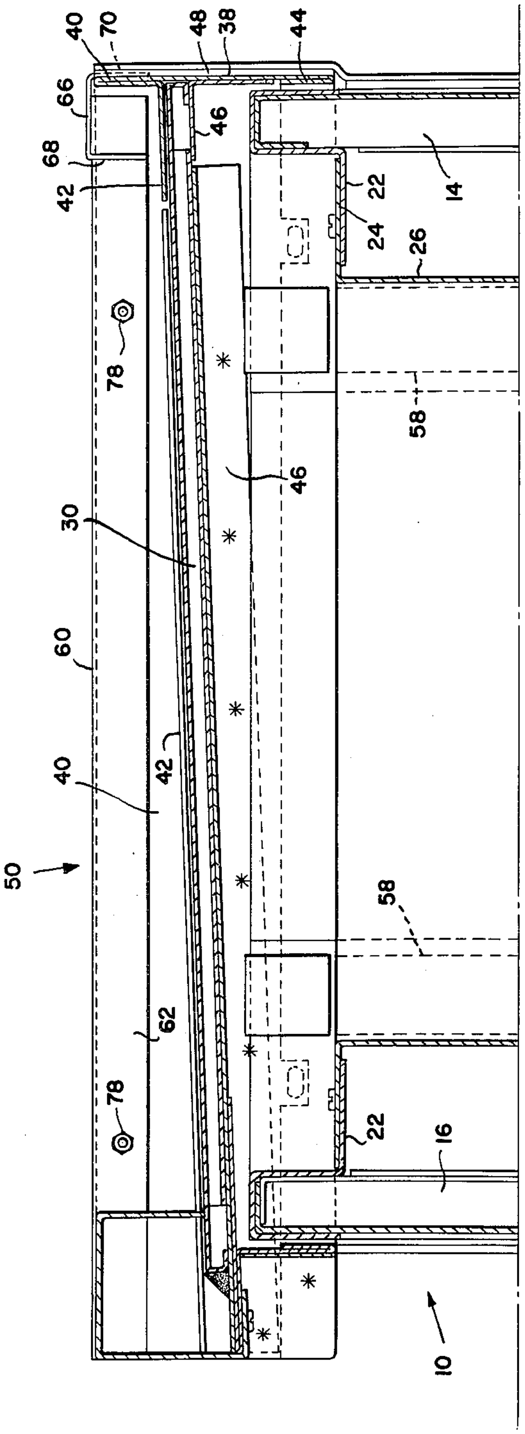
FIGURE 2 is a vertical section through the upper portion of an assembled booth taken on section line 2—2 of FIGURE 1, looking at a side of the booth.

Referring particularly to FIGURE 2, it will be noted that the flange 42 which extends across the front of the booth underlies the wall 66 of the crosspiece 64 and is of a width to extend rearwardly a substantial distance beyond the side wall 68 of the crosspiece 64.

It will be understood, of course, that the present invention is susceptible of various changes and modifications which may be made from time to time without departing from the general principles or real spirit of this invention, and accordingly it is intended to claim the same broadly as well as specifically as indicated in the appended claim.

What is claimed is:

In a multiple telephone booth assembly, the combination comprising a pair of telephone booths positioned in side-by-side spaced relation, a pair of upright flanges at the top of said assembly extending respectively across the fronts of said booths, a pair of upright flanges at the top and extending fore and aft of said assembly in opposed relation to each other, an upright member at the front of said assembly covering the opening between said booths, said upright member being of a width substantially greater than the distance between said booths, a first horizontally extending member at the top of said assembly covering the opening between said booths, said first horizontally extending member being of a width substantially less than the width of said upright member, a second horizontally extending member at the fore end and disposed transversely of said first horizontally extending member, said upright covering member and said first and second horizontally extending members being each channel shaped in transverse section, said second horizontally extending member being of a length substantially corresponding to the width of the channel formed in said upright channel member, the opposite end portions of said second horizontally extending member being disposed in embracing relation respectively to the proximate end portions of the first mentioned pair of upright flanges, and the foremost wall of said second horizontally extending member being fitted into the open upper end of said upright channel member.

References Cited in the file of this patent

UNITED STATES PATENTS

| | | |
|---|---|---|
| 356,393 | Helliwell | Jan. 18, 1887 |
| 2,103,280 | Sherron | Dec. 28, 1937 |
| 2,177,844 | Sherron | Oct. 31, 1939 |
| 2,205,826 | Small | June 25, 1940 |
| 2,489,493 | Kuenzie | Nov. 29, 1949 |
| 2,790,691 | Goebel | Apr. 30, 1957 |